United States Patent
Shimano et al.

(10) Patent No.: US 6,493,307 B2
(45) Date of Patent: Dec. 10, 2002

(54) OPTICAL HEAD HAVING TWO SEMICONDUCTOR LASERS OF DIFFERENT WAVELENGTH, AN OBJECTIVE LENS FOCUSING LASER BEAMS ON DIFFERENT THICKNESS SUBSTRATES, AND AN ANNULAR PHASE SHIFTER DECREASING FOCUSED LASER BEAM SPOT ABERRATION

(75) Inventors: Takeshi Shimano, Tokorozawa (JP); Akira Arimoto, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/086,723

(22) Filed: Mar. 4, 2002

(65) Prior Publication Data

US 2002/0114259 A1 Aug. 22, 2002

Related U.S. Application Data

(63) Continuation of application No. 09/946,757, filed on Sep. 6, 2001, now Pat. No. 6,430,140, which is a continuation of application No. 09/768,310, filed on Jan. 25, 2001, now Pat. No. 6,333,908, which is a continuation of application No. 09/501,682, filed on Feb. 10, 2000, now Pat. No. 6,256,284, which is a continuation of application No. 09/041,768, filed on Mar. 13, 1998, now Pat. No. 6,215,756.

(30) Foreign Application Priority Data

Mar. 13, 1997 (JP) .............................. 9-058800
Jun. 20, 1997 (JP) .............................. 9-163743

(51) Int. Cl.$^7$ .............................................. G11B 7/135
(52) U.S. Cl. ................................................ 369/112.26
(58) Field of Search ........................... 369/44.23–44.24, 369/44.37, 112.26

(56) References Cited

U.S. PATENT DOCUMENTS

| | | | |
|---|---|---|---|
| 5,703,862 A | 12/1997 | Lee et al. | 369/112 |
| 5,708,643 A | 1/1998 | Choi et al. | 369/112 |
| 5,808,999 A | 9/1998 | Yagi | 369/112 |
| 5,809,000 A | 9/1998 | Choi | 369/112 |
| 5,844,879 A | 12/1998 | Morita et al. | 369/112 X |
| 5,883,747 A | 3/1999 | Yamazaki et al. | 369/112 X |
| 5,883,873 A | 3/1999 | Morita | 369/112 |
| 5,883,874 A | 3/1999 | Choi | 369/112 |
| 5,889,748 A | 3/1999 | Shimano et al. | 369/112 |
| 5,903,536 A | 5/1999 | Lee et al. | 369/112 |
| 5,926,450 A | 7/1999 | Braat | 369/112 X |
| 5,930,214 A | 7/1999 | Kasahara et al. | 369/112 X |
| 5,966,364 A | 10/1999 | Kamatani | 369/112 |
| 5,995,473 A | 11/1999 | Choi | 369/112 |
| 6,215,756 B1 | 4/2001 | Shimano et al. | 369/112.26 |

FOREIGN PATENT DOCUMENTS

| | | |
|---|---|---|
| EP | 0367878 | 5/1990 |
| TW | 313663 | 6/1986 |
| WO | 97/08691 | 3/1997 |

OTHER PUBLICATIONS

Patent Abstracts of Japan, vol. 96, No. 5, May 31, 1996, for JP8–017068.*

Patent Abstracts of Japan, vol. 13, No. 43, Jan. 31, 1989, for JP63–239402.*

Patent Abstracts of Japan, vol. 18, No. 665, Dec. 15, 1994, for JP6–259804.*

* cited by examiner

*Primary Examiner*—W. R. Young
(74) *Attorney, Agent, or Firm*—Antonelli, Terry, Stout & Kraus, LLP

(57) ABSTRACT

An objective lens and an optical head including the objective lens for reading information contained on substrates having different thicknesses using laser beams having different wavelengths. The objective lens includes an annular phase shifter for decreasing an aberration of a focused spot of each of the laser beams. The annular phase shifter can be optimally combined with the objective lens having inner and outer regions each having a different substrate thicknesses.

3 Claims, 10 Drawing Sheets

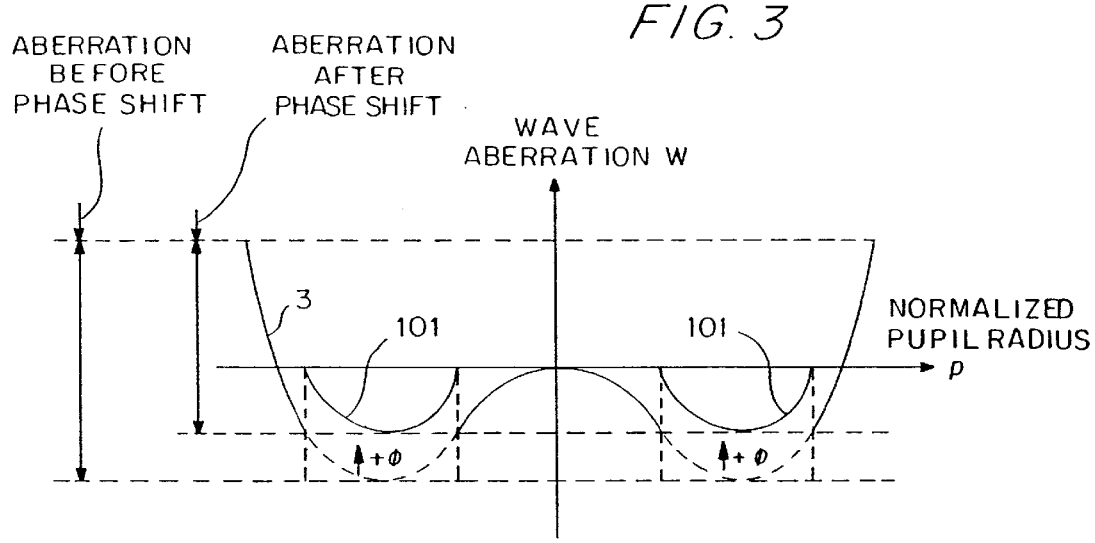
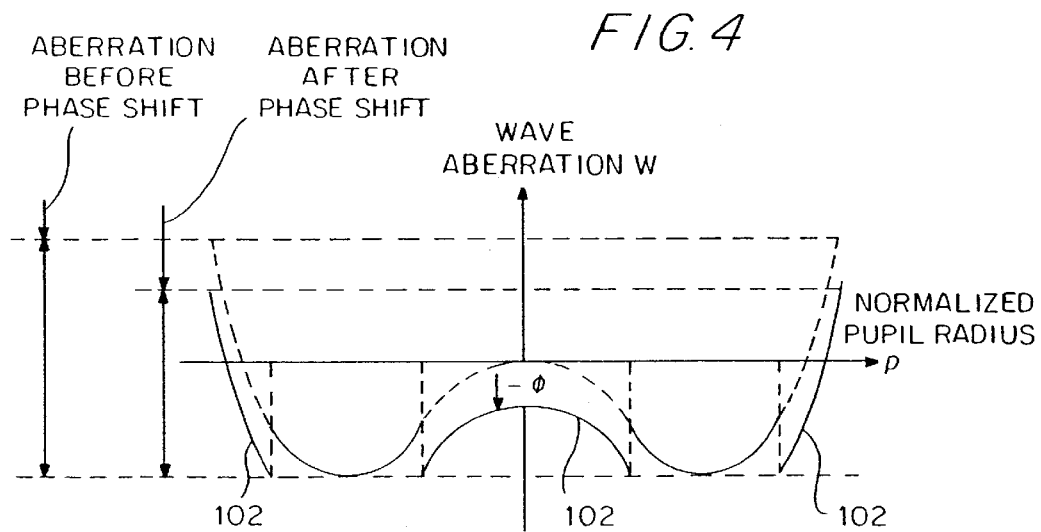

F I G. 5

| m | n | PHASE SHIFT φ (λ) ||
| --- | --- | --- | --- |
| | | ANNULAR | INVERTED ANNULAR |
| 1 | 1 | -0.1667 | 0.1667 |
| 2 | 2 | -0.3333 | 0.3333 |
| 3 | 2 | 0.5 | -0.5 |
| 4 | 3 | 0.3333 | -0.3333 |
| 5 | 4 | 0.1667 | -0.1667 |
| 6 | 5 | 0 | 0 |

| SYMBOL | DISK | WAVELENGTH (nm) | LENS | ABERRATION |
|---|---|---|---|---|
| ○ | CD | 780 | NORMAL CD LENS | NO |
| ■ | CD | 780 | NORMAL DVD LENS | YES |
| ▲ | CD | 780 | NORMAL DVD LENS + OPTIMIZED ANNULAR PHASE SHIFTER | YES |
| □ | CD | 780 | DUAL OPTIMIZED SUBSTRATE LENS + OPTIMIZED ANNULAR PHASE SHIFTER | YES |
| ◇ | DVD | 650 | NORMAL DVD LENS | NO |
| △ | DVD | 650 | DUAL OPTIMIZED SUBSTRATE LENS + OPTIMIZED ANNULAR PHASE SHIFTER | YES |

FIG. 16A

LENS SPECIFICATION

| NA | 0.6 | DISTANCE BETWEEN OBJECT AND IMAGE | ∞ |
|---|---|---|---|
| WAVELENGTH | 650 nm | LENS THICKNESS | 3.7 mm |
| FOCAL LENGTH | 5.0 mm | REFRACTIVE INDEX | 1.68818 |
| EFFECTIVE DIAMETER | 6.0 mm | COVER GLASS THICKNESS | 0.6 mm |
| MAGNIFICATION RATIO | 0 | COVER GLASS REFRACTIVE INDEX | 1.57101 |

FIG. 16B

SURFACE SHAPE

| | | FIRST SURFACE | SECOND SURFACE |
|---|---|---|---|
| SURFACE RADIUS (mm) | R | 3.802 | -23.672 |
| CONICAL CONSTANT | K | $-4.18136 \times 10^{-1}$ | $6.68318 \times 10^{1}$ |
| ASPHERICAL COEFFICIENT | $A_4$ | $-3.62774 \times 10^{-4}$ | $1.67878 \times 10^{-3}$ |
| | $A_6$ | $-5.39949 \times 10^{-5}$ | $-1.78856 \times 10^{-4}$ |
| | $A_8$ | $3.63056 \times 10^{-6}$ | $-2.95033 \times 10^{-5}$ |
| | $A_{10}$ | $-8.96894 \times 10^{-7}$ | $4.38949 \times 10^{-6}$ |

OPTICAL HEAD HAVING TWO SEMICONDUCTOR LASERS OF DIFFERENT WAVELENGTH, AN OBJECTIVE LENS FOCUSING LASER BEAMS ON DIFFERENT THICKNESS SUBSTRATES, AND AN ANNULAR PHASE SHIFTER DECREASING FOCUSED LASER BEAM SPOT ABERRATION

This is a continuation of application Ser. No. 09/946,757, filed Sep. 6, 2001, now U.S. Pat. No. 6,430,140; which is a continuation of application Ser. No. 09/768,310, filed Jan. 25, 2001, now U.S. Pat. No. 6,333,908; which is a continuation of application Ser. No. 09/501,682, filed Feb. 10, 2000, now U.S. Pat. No. 6,256,284; which is a continuation of application Ser. No. 09/041,768, filed Mar. 13, 1998, now U.S. Pat. No. 6,215,756.

BACKGROUND OF THE INVENTION

The present invention relates to an optical disk apparatus for optically reading information from an optical storage medium. More particularly the present invention relates to an optical head for reading signals from optical disks having different substrate thicknesses by using light sources having different optical wavelengths, and an objective lens for use in such optical head.

Optical disks have recently been making remarkable advances as large capacity-removable-information storage media. Accordingly, writing-reading methods, storage densities and disk sizes have taken on great diversity. Thus, it is becoming very difficult to ensure compatibility among the different systems. Among other things, CDs (Compact Disc(s)) are presently most popular, and CD-Rs (Compact Disk-Recordable(s)) which are recordable CDs having reading compatibility with CDs are becoming equally as popular. It is desired that development of new optical disks meet the important demand for compatibility with such CDs and CD-Rs.

Recently DVDs (Digital Video Disk(s)), the next generation of high density ROM following CDs and CD-Rs, have been introduced to the market. To increase the storage density of a DVD, the numerical aperture (NA) of an objective lens is increased from 0.45 for the conventional CDs up to 0.6. Letting $\lambda$ be the wavelength of a laser source to be used, the size of a focused spot on an optical disk is proportional to $\lambda/NA$, so that as the wavelength is made shorter and the NA larger, the size of the beam spot can be made smaller. If the size of the beam spot is small, it is possible to read high-density information pits with good quality, so that the storage density of the optical disk can be increased.

In light of the above, the wavelength of a semiconductor laser used for DVDs is 650 nm instead of 780 nm for CDs. However, since an increase in the NA sharply increases coma which occurs when a disk tilts, and rather degrades the beam spot, it is impossible to excessively increase the NA. For this reason, DVDs have a substrate thickness of 0.6 mm thinner than 1.2 mm of CDs so that the NA can be increased and the accompanying coma due to a disk tilt can be reduced. However, since the substrate thickness of DVDs differs from that of CDs, if a CD is read with a DVD-dedicated objective lens, a spherical aberration will occur and the beam spot will defocus. This occurs because objective lenses for optical disks are respectively intended for particular substrate thicknesses and are beforehand designed to have spherical aberrations which compensate for the particular substrate thicknesses.

Conventional apparatus for solving the above problem is described in, for example, Optical Review, Vol. 1, No. 1 (1994) pp. 27–29). In this conventional apparatus, a hologram is formed on the surface of an objective lens for 0.6 mm disks, and a CD is read with diffracted light, while a DVD is read with transmitted light. The pattern of the hologram is beforehand designed so as to compensate for spherical aberration which occurs during CD-read. However, in this conventional apparatus, since the hologram is used, a beam spot for DVDs is produced even during a CD-read operation, whereas a beam spot for CDs is produced even during a DVD-read operation. In addition, a beam reflected from a disk is again diffracted. This leads to the disadvantage of unavoidable loss of light power.

A second conventional apparatus is described in Mitsubishi Electric Co. Ltd. News Release, No. 9507 (Jun. 21, 1995). In the second conventional apparatus, both an objective lens for 0.6 mm disks and an objective lens for 1.2 mm disks are provided on an optical head, and the two lenses are switched when needed by a movable actuator. However, in this example, since the two lenses are switched when needed, there are problems such as an increase in cost due to the use of two lenses, the reproducibility of the positions of the lenses, and the degradation of response characteristics due to a large and heavy actuator.

A third conventional apparatus is described in Nikkei Electronics, Jan. 29, 1996 (No. 654), pp. 15–16. In the third conventional apparatus an aperture limitation using a liquid crystal is provided, and during a CD-read operation, the NA is reduced to 0.35 so as to reduce aberration. Since a semiconductor laser of wavelength 635 nm is used for both CDs and DVDs, the NA for CDs can be reduced to some extent. There is, however, a disadvantage in that this method cannot be used for reading CD-Rs whose reflectance becomes quite low for a beam of wavelength shorter than 780 nm.

A fourth conventional apparatus is described in Japanese Patent Application No. 342203/1995. The fourth conventional apparatus provides an objective lens in which the inner and outer regions are given different optimized substrate thicknesses, so as to realize compatibility between both DVDs and CDs at a wavelength of 650 nm. However, if a CD is to be read at a wavelength of 780 nm, this boundary NA needs to be made at least 0.45 or more, but this case leads to the disadvantage that the aberration for DVD-read becomes extremely large.

SUMMARY OF THE INVENTION

An object of the present invention is to provide an optical disk apparatus having an optical head for reading signals from optical disks having different substrate thickness by using light sources having different optical wavelengths.

Another object of the present invention is to provide an objective lens for use in an optical head for reading signals from optical disks having different substrate thicknesses by using light sources having different optical wavelengths.

Yet another object of the present invention is to provides an optical head for reading a CD having a substrate thickness of 1.2 mm by using a beam of wavelength 780 nm as well as a DVD having a substrate thickness of 0.6 mm by using a beam wavelength of 780 nm, without loss of light power, at low cost and with high precision.

The present invention provides an objective lens for focusing two laser beams having different wavelengths on an optical disks having different thicknesses. Integrally added to objective lens is an annular phase shifter for decreasing aberrations of focused spots of the respective wavelengths.

A second embodiment of the present invention provides an objective lens having different substrate thicknesses in the inner and outer regions of the objective lens for focusing a laser beam without aberration. Integrally added to the objective lens is an annular phase shifter for decreasing aberrations of focused spots of laser beams of different wavelengths.

A third embodiment of the present invention provides an optical head which includes at least two semiconductor lasers having different wavelengths, a diverging apparatus for diverging a beam reflected from an optical disk from an optical path which extends from the semiconductor lasers to the optical disk, and a detector for detecting a focused spot position control signal and a data signal from the reflected beam diverged by the diverging apparatus. The optical head further includes an objective lens for focusing beams having the respective wavelengths on optical disks having different substrate thicknesses.

A fourth embodiment of the present invention provides an optical head which includes at least two semiconductor lasers having different wavelengths, an objective lens for focusing beams having the respective wavelengths on optical disks having different substrate thicknesses, a diverging apparatus for diverging a beam reflected from an optical disk from an optical path which extends from the semiconductor lasers to the optical disk, and a detector for detecting a focused spot position control signal and a data signal from the reflected beam diverged by the diverging apparatus. The optical head further includes an annular phase shifter for decreasing aberrations of focused spots having the respective wavelengths.

BRIEF DESCRIPTION OF THE DRAWINGS

The present invention will be more apparent from the following detailed description, when taken in conjunction with the accompanying drawings, in which:

FIG. 3 is a diagram illustrating a wave aberration shape obtained from an annular phase shifter;

FIG. 4 is a diagram illustrating a wave aberration shape obtained from an inverted annular phase shifter;

FIG. 5 is a table indicating phase shift for a CD under conditions which do not affect a DVD;

FIGS. 16A and 16B are tables of the specification and shape of a DVD lens.

DETAILED DESCRIPTION OF THE PREFERRED EMBODIMENTS

Embodiments of the present invention will be described below with reference to the accompanying drawings.

Figure 1:
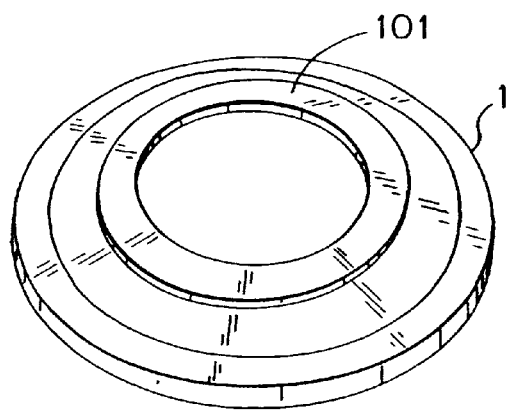
FIG. 1 is a diagram illustrating an objective lens according to the present invention;.

FIG. 1 is a diagram illustrating an objective lens according to the present invention. The construction of an objective lens according to the present invention makes use of a DVD objective lens 1. According to the present invention a doughnut-shaped annular phase shift region 101 is added to the DVD objective lens 1. The annular phase shift region 101 may be formed as a thin film, or the DVD objective lens can be worked directly into such a shape in advance. Since a normal DVD lens is designed to have no aberration for a substrate thickness of 0.6 mm, when a DVD is to be read with a laser beam of wavelength 650 nm, an aberration is made as small as possible by the phase shifter. On the other hand, when a CD having a substrate thickness of 1.2 mm is to be read with a laser beam of wavelength 780 nm, a spherical aberration due to a substrate thickness of 0.6 mm is decreased.

Figure 2:
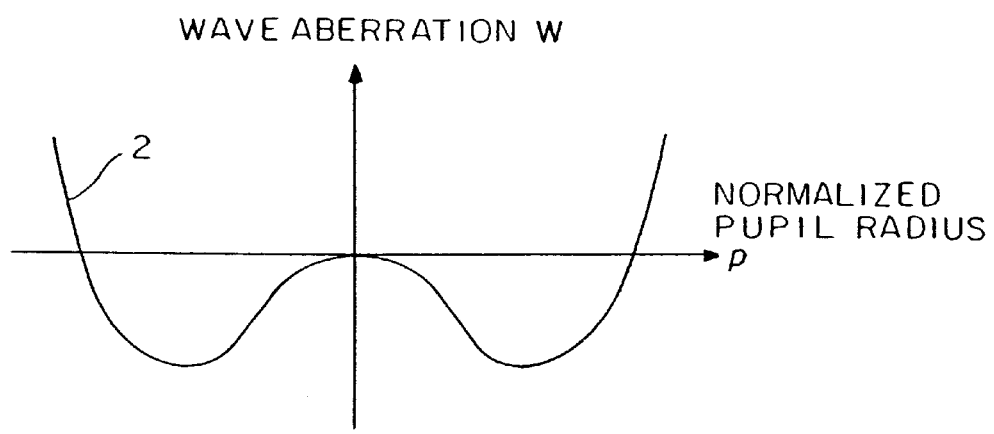
FIG. 2 is a diagram illustrating a wavefront shape of a spherical aberration.

The manner in which an aberration decreases will be qualitatively described below. FIG. 2 is a diagram illustrating the wavefront shape of a spherical aberration for an optimized focus position. In FIG. 2, the horizontal axis represents the coordinates of the pupil radius of the objective lens, while the vertical axis represents a wave aberration. A beam spot to be used for reading a CD with a DVD objective lens has a wavefront shape such as that approximately expressed by a quartic function, because of the difference in substrate thickness between the CD and the DVD. FIG. 3 is a diagram illustrating a wavefront shape obtained from an annular phase shifter. It can be seen that the maximum value of the aberration is made smaller by the annular phase shifter.

The aberration of a DVD must not become large when it is read by using the above-described DVD objective lens. One method to compensate for this is to use the difference between a wavelength for a CD-read operation and a wavelength for a DVD-read operation so that a phase shift occurs only when a CD is being read and no phase shift occurs when a DVD is being read. For this purpose, letting $\lambda 1$ be the wavelength for a CD-read operation, $\lambda 2$ the wavelength for a DVD-read operation, and $\phi$ a phase shift occurring during a CD-read operation, the following is provided:

$$(n+\phi)\lambda 1 = m\lambda 2 \qquad \text{Eq. 1}$$

(n, m: integer)

The integers m and n may be selected to satisfy the above equation. If there is no appropriate m or n, the manner of the phase shift may also be altered as shown in FIG. 4. In this case, a wavefront shape identical to that shown in FIG. 3 can be realized by applying a phase shift of $-\phi$ to the region other than the annular phase shift region. Therefore, in this case the following is provided:

$$(n+\phi)\lambda 1 = m\lambda 2 \qquad \text{Eq. 2}$$

(n, m: integer)

From this equation, for example, if λ1 is set to 780 nm and λ2 650 nm, the phase shift φ in each region is as shown in FIG. 5. If the phase shift is selected in this manner, it is possible to decrease the spherical aberration during a CD-read operation without at all affecting the wavefront for a DVD-read operation. The term "inverted annular phase shifter" used herein is a name which takes into account the case in which a phase shift is realized by a phase lag, such as when a film having a larger refractive index than air is added. In a case where a phase shift can be realized by a phase lead, as by grinding a lens, the annular phase shift region may be directly formed by grinding. Since either case is equivalent, both cases will be hereinafter referred to as the inverted annular phase shifter.

The shape of the annular phase shifter and the optimization of the phase shift will be described below. The Strehl intensity which is the main peak intensity of a beam spot having an aberration normalized with the main peak intensity of an aberration-free spot is available as an evaluation index of a beam spot. However, with such Strehl intensity, a difference in NA in the presence of an aperture limitation does not appear. For this reason, the ratio of the main peak intensity of a beam spot to a total light power incident on the pupil of an objective lens is adopted as a new evaluation index when an aperture limitation is present. For example, even for the same aperture diameter, such evaluation index becomes larger as the NA becomes larger, the spot diameter becomes smaller or the main peak intensity becomes larger.

$$\frac{\text{spot peak intensity}}{\text{total incident light power in the objective lens pupil}} = \frac{\left|\int_0^{2\pi}\int_0^R e^{i\varphi(r,\theta)} r\,dr\,d\theta\right|^2}{\int_0^{2\pi}\int_0^R r\,dr\,d\theta} \quad \text{Eq. 3}$$

$$= \frac{\left|\int_0^{2\pi}\int_0^R e^{i\varphi(r,\theta)} r\,dr\,d\theta\right|^2}{\left|\int_0^{2\pi}\int_0^R r\,dr\,d\theta\right|^2} \int_0^{2\pi}\int_0^R r\,dr\,d\theta$$

$$= I_{st}\frac{(\pi R^2)^2}{\pi R^2} = I_{st}\pi R^2$$

It can be seen from Eq. 3 that the new evaluation index is proportional to the product of the Strehl intensity and the second power of the aperture limitation radius R normalized with the radius of the full-aperture of the objective lens. In the following, η denotes the value obtained by multiplying the Strehl intensity by the second power of the normalized aperture limitation radius. In a normal CD pickup, since a wavelength of 780 nm is used and an objective lens NA is 0.45, if there is no aberration for a DVD objective lens NA of 0.6, η=1×(0.45/0.6)²=0.56, and η=0.45 at 0.8 which is the lower limit of the Strehl intensity based on Maréchal's criterion. Regarding spherical aberration due to substrate thickness error, a fourth-order spherical aberration is given by:

$$W_{40} = \frac{d}{8}\frac{n^2-1}{n^3}(NA)^4 \quad \text{Eq. 4}$$

and a sixth-order spherical aberration is given by:

$$W_{60} = \frac{d}{32}\frac{n^4+2n^2-3}{n^5}(NA)^6 \quad \text{Eq. 5}$$

In these equations, n denotes a refractive index. From these equations, an aberration, obtainable by adding an annular phase shifter which causes a phase lag of φ between a radius R1 and a radius R2, is expressed as follows:

$$W = \begin{cases} W_{60}\rho^6 + W_{40}\rho^4 + W_{20}\rho^2 + W_{00} & (0 \le \rho \le R_1, R_2 \le \rho) \\ W_{60}\rho^6 + W_{40}\rho^4 + W_{20}\rho^2 + W_{00} + \phi & (R_1 \le \rho \le R_2) \end{cases} \quad \text{Eq. 6}$$

The Strehl intensity can be approximated as follows:

$$I_{st} = 1 - \left(\frac{2\pi}{\lambda}W_{rms}\right)^2 \quad \text{Eq. 7}$$

$$= 1 - \left\{\frac{2\pi}{\lambda}\left(\overline{W^2} - (\overline{W})^2\right)\right\}$$

Therefore, from this equation, R1, R2 and φ for a maximum η as well as the NA, W20 and W00 of the aperture limitation are obtained. Actually, numerical-formula processing software was used to analytically obtain W20 and W00 and to numerically obtain R1, R2 and φ as well as the NA of the aperture limitation. As the result, it was found that when the inner and outer diameters of the annular phase shifter were NA0.20 and NA0.42 and the NA of the aperture limitation was 0.456 and the phase shift was 0.265 λ (λ=780 nm), η=0.48 became a maximum and larger than η=0.45 based on Maréchal's criterion. On the other hand, when optimization was performed with only the aperture limitation without using the annular phase shifter, η=0.45 was a maximum at NA0.39. In other words, this is equivalent to an improvement of from 0.61 to 0.86 in the Strehl intensity in terms of NA0.45. For this phase shift, the aberration occurring during a DVD-read operation was 0.33 λ (λ=650 nm) in terms of RMS wavefront aberration. This is almost equivalent to the working accuracy of lenses, and it can be considered that no problem occurs in practice.

If this optimized phase shift of 0.265 λ is compared with the previously described phase shift which does not affect a DVD-read operation, it can be seen that the closest phase shift is 0.333 λ of the inverted annular phase shifter for m=2 and n=2 or of the annular phase shifter for m=4 and n=25 3. However, as m becomes larger, the step of a film or lens which causes a phase shift becomes thicker and the deviation of a phase shift when a wavelength shift occurs in a semiconductor laser becomes larger. Therefore, the inverted annular phase shifter is more preferably herein. When the shape of a phase shifter which was fixed at this phase shift which does not affect a DVD-read operation was obtained, η=0.47 was a maximum at an inner diameter of NA0.20, an outer diameter of NA0.44, and an aperture limitation of NA0.48. This is almost equal to the above-described optimized phase shift.

The effects of the annular phase shifter applying to the DVD objective is confirmed by ray tracing. FIG. 16 shows the specifications and the shape of the example DVD lens, where R, k, A4, A6, A8 and A10 are the paraxial curvature radius, conical constant, 4-th, 6-th, 8-th and 10-th order of aspherical coefficients, respectively. The surface shape is defined using these parameters and radial coordinate r by $$z(r) = \frac{r^2}{R + \sqrt{R^2(K+1)r^2}} + A_1 r^4 + A_2 r^6 + A_3 r^8 + A_4 r^{10} \quad \text{Eq. 8}$$

where the shape is assumed to be symmetrical to the axis. When the collimated light of wavelength of 780 nm is focused through CD substrate of thickness 1.2 mm without the annular phase shifter, the root mean square (RMS) wave front aberration of the spot was 0.1279 λ (λ=780 nm) in the aperture of NA 0.45. By applying the annular phase shifter of 0.3333λ (λ=780 nm) to this lens, however, the aberration was reduced to 0.07366 λ (λ=780 nm). On the other hand, when the collimated light of wavelength of 650 nm is focused through DVD substrate of thickness 0.6 nm with the annular phase shifter, the RMS wave front aberration of the spot was accordingly less than 0.001 λ (λ=650 nm) in the aperture of NA 0.6.

The above description has been made on the assumption that the aperture limitation is employed, but this does not necessarily mean that an actual aperture is needed. Actually, it can be considered that the above-described process is almost equivalent to specifying an evaluation area of a pupil when an optimized focus position is to be obtained by using an RMS wavefront aberration as an evaluation function. If a focus error is adjusted so that the RMS wavefront aberration becomes as small as possible within the area of the aperture limitation, the aberration of light outside the area of the aperture limitation naturally becomes larger and the slope of the wavefront also becomes larger. For this reason, the rays in such area cross a focal plane at a position greatly offset from a focus. Therefore, the presence of such rays is almost equivalent to the absence of the rays in terms of a focused spot.

If only the annular phase shifter is used in the above-described manner, spot performance will be improved but a Strehl intensity of 0.86 for NA0.45 may not completely suffice when account is taken of a degradation of a spot due to misalignment of optical parts, disk tilt, focus error or the like. For this reason, in combination with the above construction, different substrate thicknesses to be optimized may be provided inside and outside a lens. Such lens is hereinafter referred to as the dual optimum substrate lens (DOSL). This lens was invented by the present inventors as a method of realizing compatibility between both DVDs and CDs at a wavelength of 650 nm. This method is disclosed in Japanese Patent Application No. 342203/1995. However, such lens has the disadvantage that it is necessary to make this dual NA at least NA0.45 or more for the purpose of reading CDs at a wavelength of 780 nm, and in this case, the aberration for DVD-read becomes extremely large.

To solve such disadvantages, a phase shifter and the dual optimum substrate lens were combined to optimize the shape of the phase shifter, a phase shift, an inside-outside boundary radius and an inside substrate thickness at the same time, and it has been found out that such combination has the effect of decreasing both aberrations which occur due to the dual optimum substrate lens during a CD-read operation at a wavelength of 780 and during a DVD-read operation at a wavelength of 650 nm, thereby further improving the spot performance for a CD-read operation. This combination will be described below.

The wave aberration due to the combination of the dual optimum substrate lens and the phase shift is expressed as follows:

$$W = \begin{cases} W_{601}\rho^6 + W_{401}\rho^4 + W_{201}\rho^2 + W_{001} & (0 \le \rho \le R_1) \\ W_{601}\rho^6 + W_{401}\rho^4 + W_{201}\rho^2 + W_{001} + \phi & (R_1 \le \rho \le R_2) \\ W_{602}\rho^6 + W_{402}\rho^4 + W_{202}\rho^2 + W_{002} + \phi & (R_2 \le \rho \le R_3) \\ W_{602}\rho^6 + W_{402}\rho^4 + W_{202}\rho^2 + W_{002} & (R_3 \le \rho \le R_4) \end{cases} \quad \text{Eq. 8}$$

In this equation, R1 denotes the inner diameter of the annular phase shifter, R2 the boundary radius, R3 the outer diameter of the annular phase shifter, and R4 the radius of the aperture limitation. The disk substrate thickness required to remove an aberration differs between inner and outer regions separated by the boundary radius, and the inner region is 0.6 mm thick for a DVD-read operation, while the outer region is optimized to be between 0.6 mm thick and 1.2 mm thick. Accordingly, the discriminator "1" or "2" is affixed to each of the aberration coefficients W60 and W40 for spherical aberration for the purpose of discrimination between the inner and outer regions. The focus errors W201 and W202 are determined from a spherical aberration so as to minimize the RMS wavefront aberrations of the inner region and the outer region, and the constant terms W001 and W002 are determined so that the average values of the wave aberration of the inner and outer regions become the same, thereby optimizing the total RMS wavefront aberration. The differences between W201 and W202 and between W001 and W002 are determined by the difference between the inner and outer corresponding substrate thicknesses of the lens, and W201 and W001 were also analytically obtained by numerical-formula processing software under conditions for minimizing the RMS wavefront aberration under the conditions of the phase shifter which were given W202 and W002.

Figure 6:
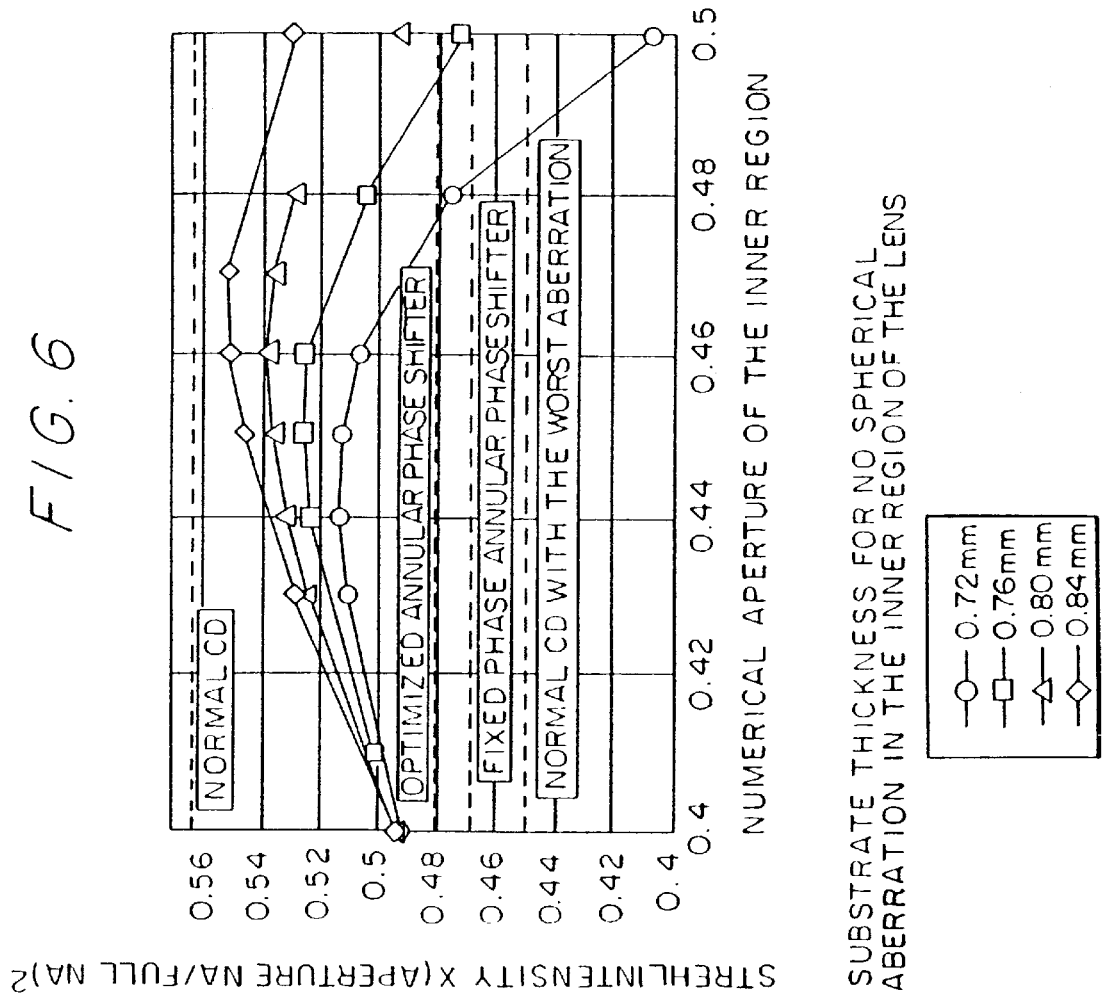
FIG. 6 is a graph illustrating spot performance for a CD-read operation when a dual and a phase shifter are combined.

Further, regarding the given inner corresponding substrate thickness and the boundary radius R2, conditions for maximizing η were obtained by numerically changing R1, R3, R4 and the phase shift. The result is shown in FIG. 6. In FIG. 6, the horizontal axis represents the boundary radius of the dual optimum substrate lens and the vertical axis represents η, and the result of calculations under optimized conditions for different central substrate thicknesses is plotted. In the graph, dashed lines respectively indicate a CD having no aberration, a lower limit level equivalent to a Strehl intensity of 0.8, the above optimized phase shifter, and a fixed phase shifter. These lines cannot be plotted with points on the graph because no dual optimum substrate lens is used. RMS wavefront aberration occurring during a DVD-read operation at that time is shown in FIG. 7.

Figure 7:
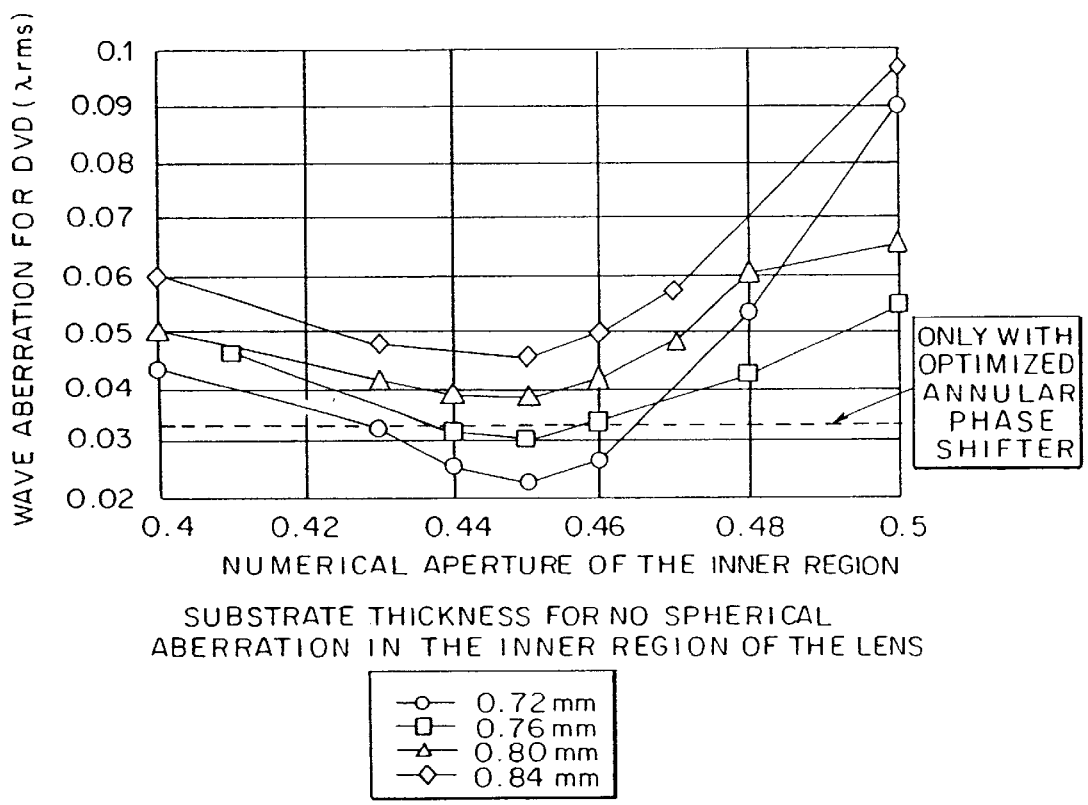
FIG. 7 is a graph illustrating a RMS wavefront aberration occurring during a DVD-read operation.

As can be seen from a comparison of FIGS. 6 and 7, as the central substrate thickness is made closer to 1.2 mm, the performance for CDs becomes higher and the aberration for DVDs increases. Therefore, a decision as to which of these points should be selected as an optimum point depends on the distribution of various margins of the system. It is considered, however, that it is almost possible to accept a CD performance of η=0.526 (0.94 in terms of the Strehl intensity for CDs) and a DVD RMS wavefront aberration of 0.030 for a central substrate thickness of 0.76 mm and a boundary radius of NA0.45. When the phase shifter is not provided, the evaluation factor of a CD and DVD aberration are 0.414 and 0.031, respectively. Accordingly, the aberration of the light DDot for both a CD and a DVD are decreased. Furthermore, at this point, the maximum value of the CD performance and the minimum value of the DVD aberration coincide with each other. The phase shift of the annular phase shifter at this time is 0.2985 λ (λ=780 nm), the inner diameter is NA0.2145, and the outer diameter is NA0.45 which coincides with the boundary radius NA.

Figure 8:
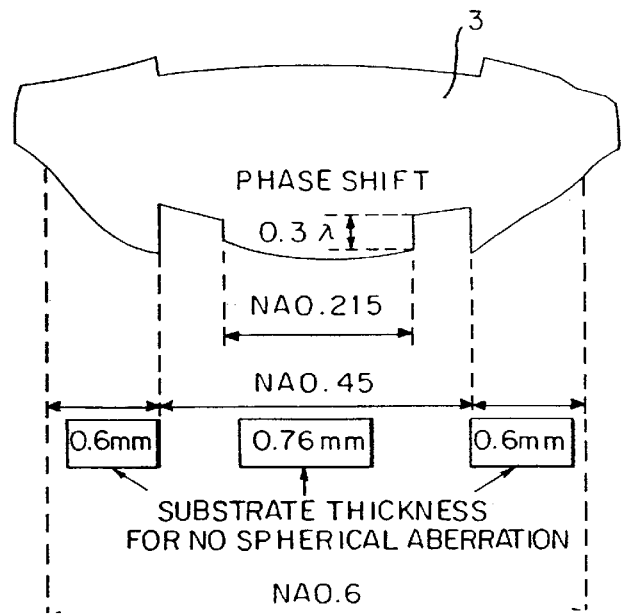
FIG. 8 is a diagram illustrating a dual optimum substrate lens with which an optimized inverted annular phase shifter is formed integrally.

FIG. 8 is a diagram illustrating a dual optimum substrate lens with which an inverted annular phase shifter is formed integrally. Since the inverted annular phase shifter is formed integrally with the lens, the region of the annular phase shifter is recessed. Although a step for the dual optimum substrate lens is also formed on a disk-side surface having a comparatively moderate curvature, this step may be provided on only an image side.

Figure 9:
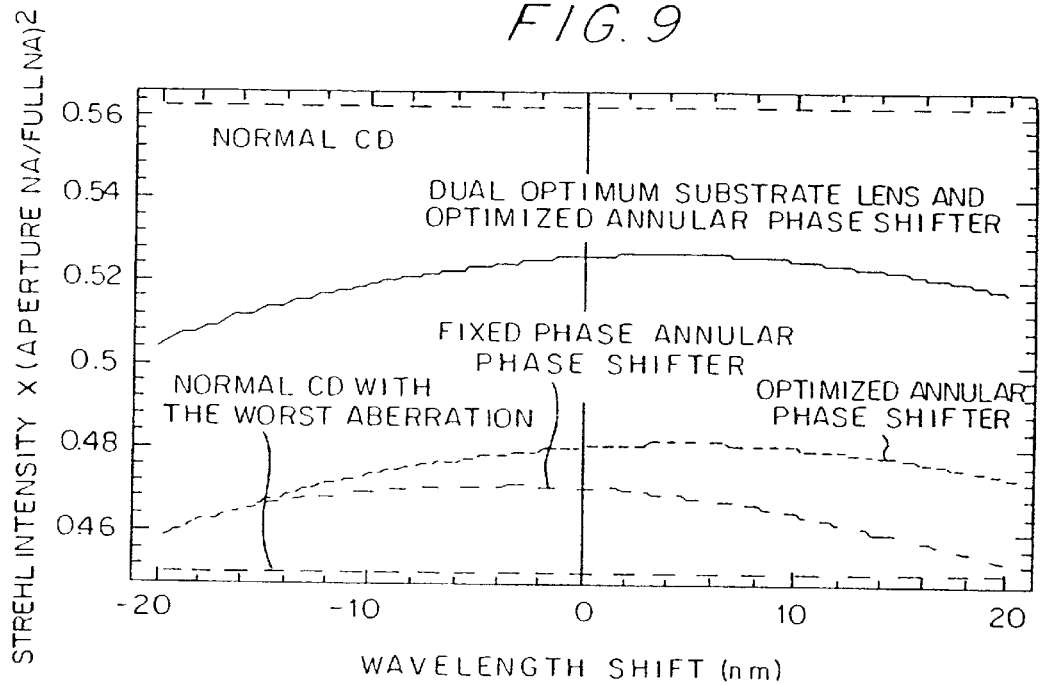
FIG. 9 is a graph illustrating a variation in spot performance for a CD-read operation due to a shift of a CD-read wavelength.

FIG. 9 illustrates the value of the CD-read spot performance η affected by a shift of a CD-read wavelength. Although the range of the horizontal axis is ±20 nm, the wavelength range in which the value of η shifts due to temperature variations or the like seems to be about ±10 nm. The degradation within the wavelength range is from η=0.53 to approximately η=0.52 at a wavelength shift of −10 nm, and is almost negligible because of a variation of from 0.93 to about 0.92 in terms of the Strehl intensity for NA0.45. In addition, FIG. 9 illustrates the values of the previously-described optimized annular phase shifter and the fixed annular phase shifter.

Figure 10:
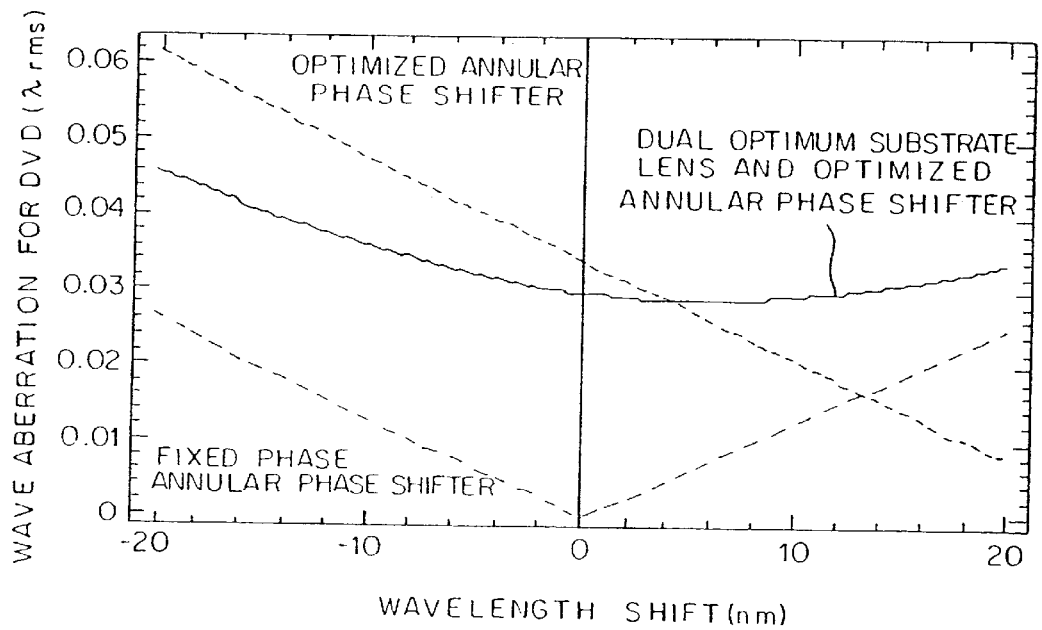
FIG. 10 is a graph illustrating a RMS wavefront aberration for a wavelength shift during a DVD-read operation.

FIG. 10 illustrates a RMS wavefront aberration for a wavelength shift during a DVD-read operation at a wavelength of 650 nm, and the aberration increases from 0.030 λ up to 0.036 λ at a wavelength shift of −10 nm when the dual optimum substrate lens and the optimized annular phase shifter are combined. It can be considered that this increase is also within a fully allowable range. In addition, FIG. 10 illustrates the aberrations of the previously-described optimized annular phase shifter and the fixed annular phase shifter. Regarding the fixed annular phase shifter, since its phase shift is selected so that no aberration occurs for DVDs, the aberration is 0 at a wavelength shift of 0. Regarding the optimized annular phase shifter, since its phase shift is offset from a phase shift which causes no aberration for DVDs, the wave aberration linearly varies toward a wavelength shift which corresponds to the phase shift.

Figure 11:
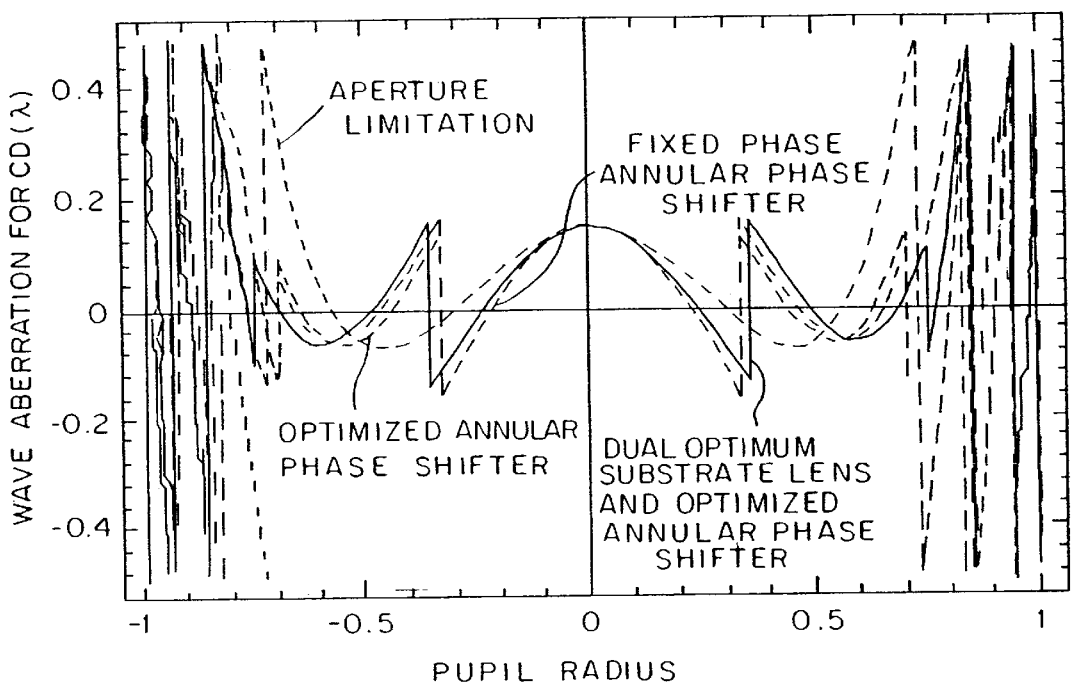
FIG. 11 is a graph illustrating wave-aberration shapes for a CD-read operation.

FIG. 11 is a graph illustrating wave-aberration shapes for a CD-read operation at a wavelength of 780 nm. For each of the wave-aberration shapes, since a focus error is optimized within the NA range of an aperture limitation and the horizontal axis represents the coordinates of the pupil radius over a full-aperture of NA0.6, the aberrations become extremely large in their peripheral portions. On the other hand, since the vertical axis represents the aberrations in a folded form within the range of ±0.5 λ, the peripheral portions seem to be sharply vibrating. These aberrations are suppressed over an NA wider than when a focus error is optimized with only the aperture limitation. Furthermore, the rise of the wavefront outside the range of the aperture limitation NA is also sharp, and it is expected that the effect of the aperture limitation becomes more remarkable because of such a large aberration.

Figure 12:
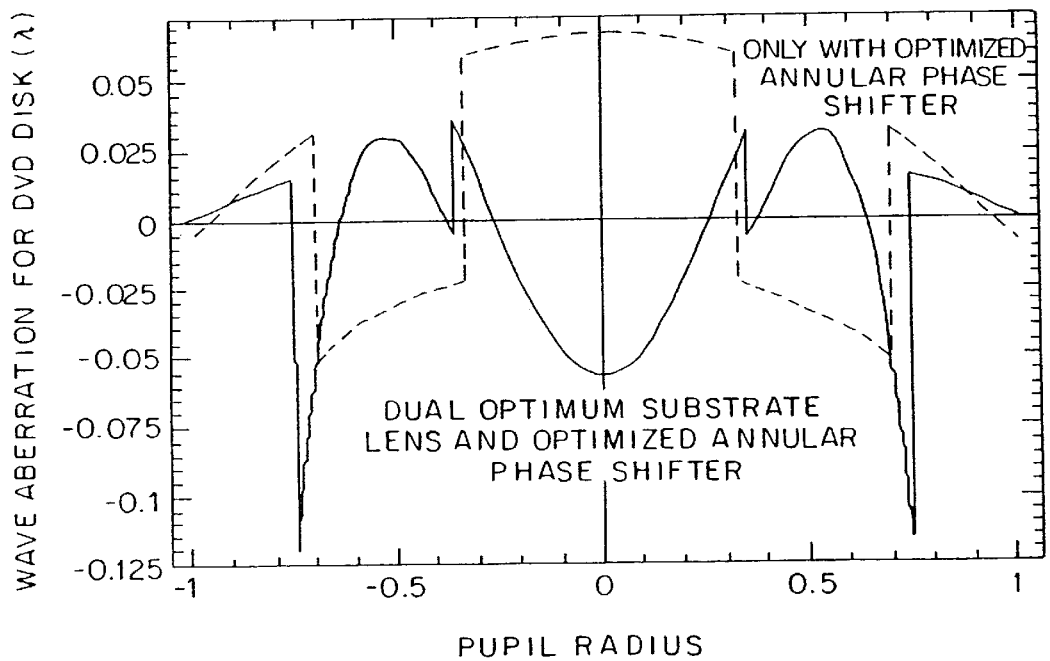
FIG. 12 is a graph illustrating wave-aberration shapes for a DVD-read operation.

FIG. 12 illustrates wave aberrations for a DVD-read operation at a wavelength of 650 nm. Since the wave aberration for only the aperture limitation and that for only the fixed phase shifter, both of which are shown in FIG. 11, become completely zero in FIG. 12, FIG. 12 only illustrates the case in which the dual optimum substrate lens and the optimized phase shifter are combined and the case of only the optimized phase shifter. From the fact that the aberration does not become zero even in the outermost portion in which no aberration at all occurs, it is seen that a small focus error occurs over the entire pupil. This is because the total RMS wavefront aberration becomes small owing to the small focus error if the phase shift caused by the phase shifter is regarded the aberration. In any case, the value of the vertical axis of the graph is considerably small and the distinctiveness of the wavefront shape is reduced to an actually negligible degree of RMS wavefront aberration.

Figures 13A, 13B:
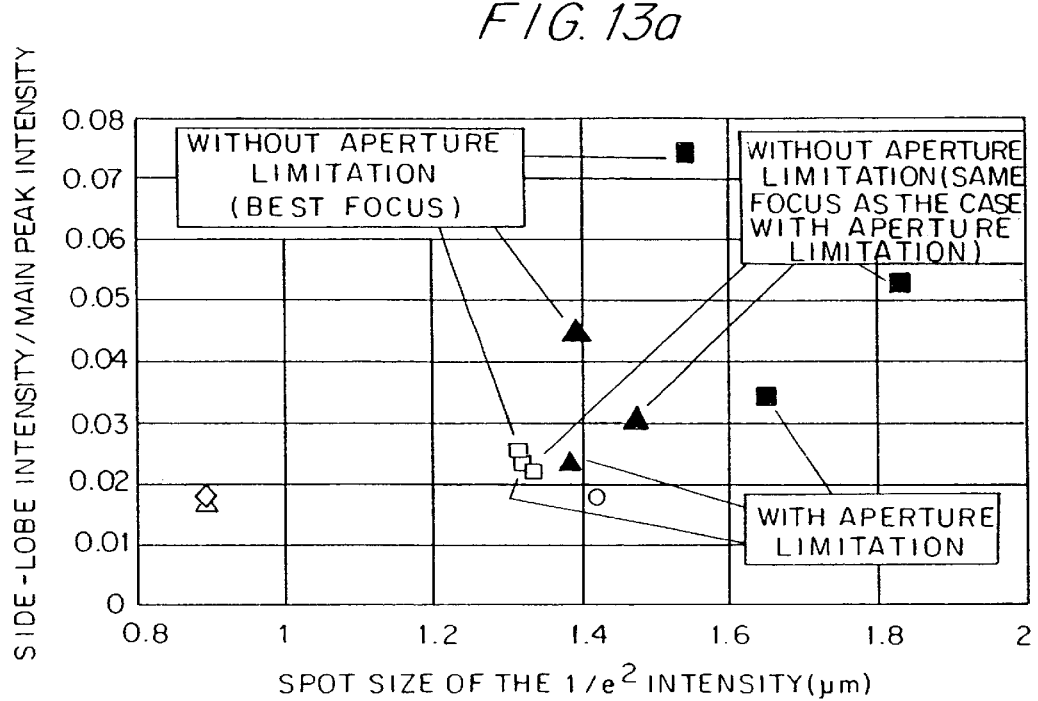
FIGS. 13a and 13b are a graph and a table illustrating the result of calculations on spot shapes.

FIG. 13A illustrates the result of calculations on spot shapes. In the graph, the horizontal axis represents the spot size of an intensity which is exp (−2) times the peak intensity of a spot, while the vertical axis represents the value of the intensity of a side-lobe normalized with the main peak intensity of the spot. Accordingly, since it is desirable that both the spot and the side-lobe be small, it follows that a plotted point nearer to the bottom left of the graph corresponds to a spot of higher resolution. Assuming that the intensity distribution of the pupil of the objective lens is a symmetrical Gaussian distribution, the shown calculation result is that obtained when the ratio of a lens diameter to the range of the intensity of exp (−2) times the intensity of the center of the Gaussian distribution in the pupil is 0.1 and the ratio of the intensity of the peripheral portion of the lens to the intensity of the central portion thereof is 0.98.

In FIG. 13B, a white circle denotes a normal CD lens having no aberration, and as the position of a plotted point is nearer to the white circle, read-out performance becomes closer to that of the normal CD lens. Each black square denotes a normal DVD lens with only an aperture limitation. As such black squares, there are plotted three points which respectively correspond to the case in which the aperture limitation is actually inserted, the case in which the aperture limitation is omitted at that focus position, and the case in which the aperture limitation is omitted and the focus position is shifted so that the spot peak intensity becomes a maximum.

Any of the cases is inferior in spot resolution to the normal CD lens having no aberration. Each block triangle denotes the case in which only the optimized annular phase shifter is inserted, and there are similarly three plotted points.

Although the spot size is considerably improved as compared with the case of the aperture limitation only, the side-lobe becomes considerably large if there is no aperture limitation. Each white square denotes the case in which the dual optimum substrate lens and the optimized annular phase shifter are combined. Although there are similarly three plotted points, it is seen that these three plotted points are considerably close to one another. In other words, it is seen that in this case it makes no matter whether there is an aperture limitation or not, and since the aberration of a beam outside the range of a virtual aperture limitation sharply increases, the forming of a spot is not substantially affected.

In this case, the beam spot is slightly smaller in spot size and slightly larger in side-lobe than the normal CD lens having no aberration.

The reason why the value of n which is the evaluation index of the spot performance, is almost equal or slightly inferior to the normal CD lens having no aberration is presumed to be that the effect of the side-lobe which is not completely decreased is canceled by reducing the spot size. In addition, the result of calculations on a spot for a DVD-read operation is plotted with a white triangle and diamond at the bottom left. The diamond denotes a spot for reading a DVD without aberration, and the triangle denotes the case in which the optimized dual optimum substrate lens and the optimized annular phase shifter are combined. Spot shapes for DVDs are almost the same.

Figure 14:
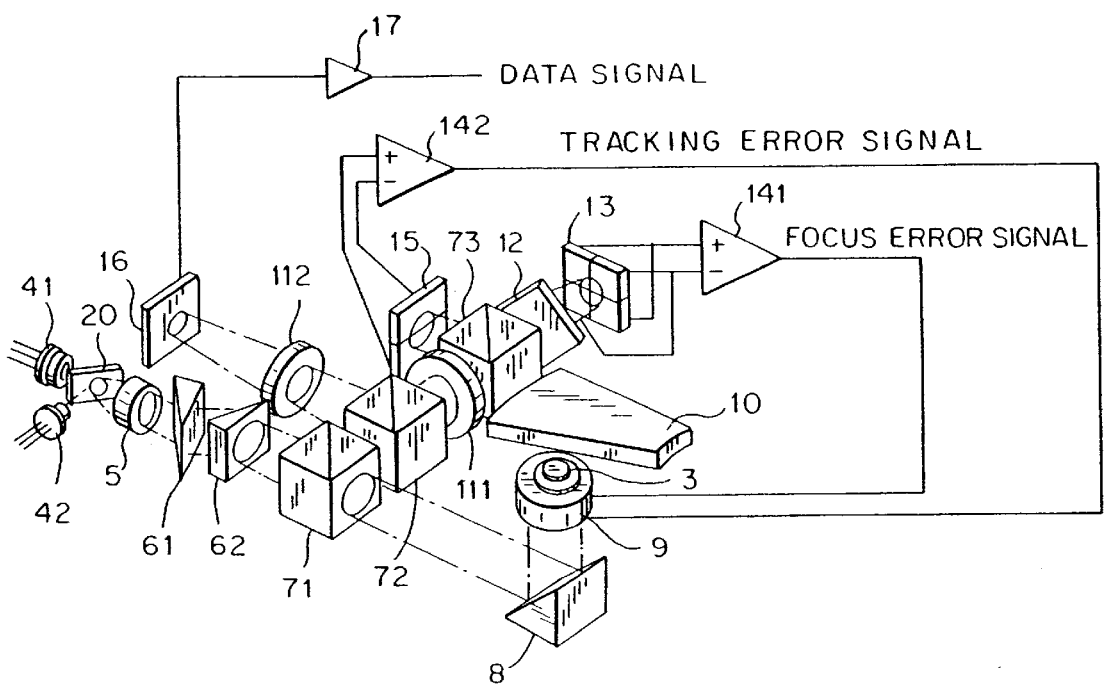
FIG. 14 is a diagram illustrating an embodiment of an optical head of the present invention.

FIG. 14 illustrates an embodiment of an optical head. Light from semiconductor lasers 41 and 42 of different wavelengths are combined by dichromatic mirror 20 and formed into parallel light by a collimator lens 5. The elliptical beam is formed into a circular beam by beam forming prisms 61 and 62. If the efficiency of the optical system is sufficiently high or the track pitch of a disk is wider than the gap between a main lobe of a beam spot and a first dark line on the disk, the beam forming prisms can also be advantageously omitted in terms of the number of component parts or for the purpose of decreasing crosstalk between adjacent tracks. The beam is transmitted through a beam splitter 71 and reflected by an erect mirror 8, and is then focused on an optical disk 10 by an objective lens 3 according to the present invention. The objective lens 3 is provided on a two dimensional actuator 9. The optical disk 10 may be a CD or a DVD. The two-dimensional actuator 9 moves in the direction of a disk radius in response to a tracking error signal and positions the beam spot on a track, and also moves in the direction of the optical axis in response to a focus error signal and positions a focus position on the disk.

The reflected beam again passes through the objective lens 3 and the erect mirror 8, and is reflected by the beam splitter 71 and conducted toward a detecting optical system.

The beam transmitted through a beam splitter 72 is formed into a focused beam by a focusing lens 111, and enters a beam splitter 73. The beam transmitted through the beam splitter 73 is transmitted through a cylindrical lens 12 and is made incident on a four-split photodetector 13. A differential signal obtained from the sum signals of the diagonal components of this split photodetector is outputted from a differential amplifier 141 as a focus error signal.

The beam reflected by the beam splitter 73 is also made incident on a two-split photodetector 15, and a differential signal obtained from the outputs of the two-split photodetector 15 is outputted from a differential amplifier 142 as a tracking error signal. The beam reflected by the beam splitter 72 is focused on a photodetector 16 by a focusing lens 112, and the signal photoelectrically converted by the photodetector 16 is amplified by an amplifier 73 so that a data signal is obtained. The data signal may be detected from a sum signal of the outputs from the detector for detecting a servo signal. In this case, the servo signal may be detected by band-limiting a signal detected up to a signal band, through a low-pass filter or the like. The servo detecting optical system is one example, and another system may also be used.

Figure 15:
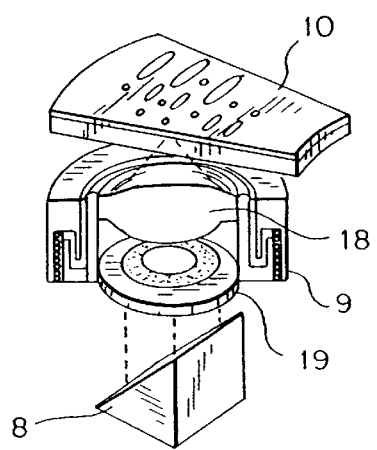
FIG. 15 is a diagram illustrating an embodiment of the present invention in which an objective lens and an annular phase shifter are integrated in a hybrid form.

Although the above description has referred to the embodiment in which the annular phase shifter is formed integrally with the objective lens, FIG. 15 shows another embodiment in which a DVD objective lens 18 and an independent annular phase shifter 19 are integrated in a hybrid form as an optical head which is incorporated in a two-dimensional actuator. Since it is assumed that this embodiment is substituted for only a portion corresponding to the optical system of FIG. 14 which extends from the erect mirror to the disk, FIG. 15 shows only the corresponding portion.

By using an annular phase shifter or by optimally combining the annular phase shifter and an objective lens having inner and outer regions each having a different substrate thickness which causes no aberration, it is possible to read a DVD having a substrate thickness of 0.6 mm with a laser beam of wavelength 650 nm and a CD having a substrate thickness of 1.2 mm with a laser beam of wavelength 780 nm by one lens without the need for an aperture limitation. Thus, using the present invention it is possible to provide a small-size inexpensive optical head.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. An objective lens for focusing a first laser beam having a first wavelength on a first substrate and focusing a second laser beams having a second wavelength which is different from said first wavelength on a second substrate having a different thickness from said first substrate, wherein said objective lens includes a phase shifter having a rectangular groove, wherein said objective lens with said phase shifter is made of one material, wherein said objective lens has an outside portion for focusing said first wavelength on said first substrate and an inside portion for focusing said second wavelength on said second substrate, and wherein aberration of a region of said phase shifter moves toward plus so that the aberration of said first wavelength approaches zero closer than an aberration without said phase shifter and aberration of a region of said phase shifter moves toward minus so that the aberration of said second wavelength approaches zero closer than an aberratio n without said phase shifter.

2. The objective lens according to claim 1, wherein said first wavelength is 780 nm and said second wavelength is 650 nm.

3. The objective lens ac cording to claim 1, wherein said first thickness is 1.2 mm and said second thickness is 0.6 mm.

\* \* \* \* \*